| [72] | Inventors | Eugene H. Wegner;<br>Charles A. Stratton, both of Bartlesville, Okla. |
|---|---|---|
| [21] | Appl. No. | 12,119 |
| [22] | Filed | Feb. 17, 1970 |
| [45] | Patented | Aug. 10, 1971 |
| [73] | Assignee | Phillips Petroleum Company |

[54] OIL RECOVERY EMPLOYING VISCOSIFIERS PRODUCED BY THE ACTION OF ANIONIC SURFACTANTS ON BACTERIAL CULTURES
6 Claims, No Drawings

| [52] | U.S. Cl. | 166/246, 166/275 |
|---|---|---|
| [51] | Int. Cl. | E21b 43/22 |
| [50] | Field of Search | 166/246, 268, 275 |

[56] References Cited
UNITED STATES PATENTS

| 3,032,472 | 5/1962 | Hitzman | 166/246 |
|---|---|---|---|
| 3,198,268 | 8/1965 | Lindblom et al. | 166/246 X |
| 3,326,286 | 6/1967 | Harvey | 166/246 |
| 3,340,930 | 9/1967 | Hitzman | 166/246 |
| 3,342,732 | 9/1967 | Goetz | 166/246 X |
| 3,372,748 | 3/1968 | Cook | 166/246 |

*Primary Examiner*—Stephen J. Novosad
*Attorney*—Young and Quigg

ABSTRACT: Bacterial cultures are treated with anionic surfactants to form a viscosifier for use in preparing a thickened aqueous medium for employment in the recovery of oil from oil-bearing stratum by waterflood methods.

OIL RECOVERY EMPLOYING VISCOSIFIERS PRODUCED BY THE ACTION OF ANIONIC SURFACTANTS ON BACTERIAL CULTURES

This invention relates to methods for recovering petroleum from oil-bearing stratum by aqueous fluid drive. This invention relates to a method of recovering oil by injecting an aqueous medium through an injection well into a subsurface oil-bearing formation to displace the oil therein so it may be recovered from a production well leading from the surface of the earth to the formation. This invention further relates to a process for recovering crude oil which is displaced from subterranean oil-bearing formations by flooding with an improved aqueous medium containing a viscosifier prepared from bacterial cells and an anionic surfactant.

In conventional supplemental oil recovery operations a fluid is injected into the oil-bearing formation through an injection means, comprising one or more injection wells. The fluid is passed into the formation, displacing oil within and moving it through the formation. Oil is produced from production means, comprising one or more production wells, as the injected fluid passes from the injection means towards the production means. In a particular recovery operation of this sort, water or brine is usually employed as the injected fluid, and the operation is referred to as waterflooding. The injected water is referred to as the flooding water as distinguished from the in situ, or connate water. The waterflooding process is attractive because the water utilized can ordinarily be obtained at little cost and need not be recovered from the reservoir in order to make the process economically feasible.

Waterflooding operations are conventionally carried out using certain regular flooding patterns. The flooding pattern utilized may not cover the entire reservoir and hence, the volume of the reservoir for purposes of particular flooding operations is normally considered to be the volume of that portion of the reservoir underlying the lateral area defined by the flood pattern. In a large reservoir, several flood patterns may be carried out simultaneously.

While conventional waterflooding processes are effective in obtaining additional oil from an oil-containing subterranean formation, it has a number of shortcomings. A primary shortcoming of this technique is the tendency of the flooding water to finger through an oil-containing formation and to bypass substantial portions thereof. By fingering is meant the developing of unstable bulges or stringers which advance toward the production means more rapidly than the remainder of the flooding water. Furthermore, the water does not normally displace as much oil in the portions of the formations which it contacts as it potentially is capable of doing when fingering occurs. The net result is an inefficient oil displacement action on the part of the water.

Several methods have been suggested for improving the mechanics of waterflooding procedures, particularly with the view to reducing the degree of fingering and bypassing, and the like. One suggestion has been to increase the viscosity of the water drive medium relative to the oil by incorporating water soluble viscous agents within the water. Materials that have been suggested for this purpose include gums, polysaccharides, polymers, and the like.

While these additives are effective to some degrees in increasing the viscosity of the flooding water, they prove ineffective for a variety of reasons for oil recovery procedure. Many of these additives form insoluble precipitates with ions contained either in the flooding water or in the in situ fluids. Also, many of the aqueous solutions of these additives suffer severe reductions in viscosity when contacted with brines, such as solutions containing sodium chloride or calcium chloride. Additionally, many of these materials are quite expensive and their use is not feasible from the standpoint of economics.

We have now discovered a process that provides a new and improved viscosifier for use in preparing aqueous medium as waterflooding solutions which are free of the disadvantages which have characterized the viscosifiers suggested in the past. In accordance with the present invention, it has been found that a viscosifier that is economically produced and very efficient for recovering oil from subterranean reservoirs can be prepared by treating bacterial cultures with anionic surfactants.

Accordingly, it is an object of this invention to provide an improved type of oil displacement process in which a marked increase in the viscosity of the driving fluid is obtained. It is also an object of this invention to provide an inexpensive method for providing an aqueous medium for waterflooding. A further object of this invention is to provide a stable aqueous medium as a driving fluid for oil recovery.

In accordance with this invention, bacterial cells are treated with an anionic surfactant to provide a viscosifier for employment in an aqueous medium that is injected into an oil-bearing formation to displace the oil therefrom. This invention is particularly surprising in that untreated whole bacterial cells are ineffective viscosifiers for employment in aqueous mediums as fluid drives for recovering oil. Not only are the bacterial cells themselves ineffective but bacterial cells that have been treated with nonionic surfactants likewise are ineffective.

The particular method employed for providing the bacterial cultures employed in this invention is not critical. Although yeasts have been generally found to be ineffective, any bacteria can be suitably employed. Thus, the particular bacteria is also not critical and we have cultured and used a host of bacteria that were all suitable for employment according to this invention.

*Pseudomonas* sp. bacteria were generally employed in the exemplary runs reported in our disclosure. *Bacillus, Microbacterium, Actinomyces, Nocardia*, and the like, are illustrative genera of bacteria which can be employed. We prefer to employ gram negative bacteria and more preferably *Pseudomonas* sp. bacteria according to this invention.

Any conventional process can be employed for preparing bacterial cultures, but of course, it is preferred that the most economical method to produce the largest quantity of bacterial cells in the least amount of time be used. Accordingly, a suitable fermentation media is simply inoculated with the bacteria and said fermentation media maintained under growth conditions to permit multiplication of the bacterial cells. Carbon and nitrogen sources are, of course, provided and suitable minerals, growth factors, vitamins, and the like, are generally added in amounts sufficient to provide for the particular needs of the bacteria utilized. The substrate material on which bacteria is grown is also not critical. Substrates such as sugars, n-paraffins, alcohols such as ethanol or methanol, and other carbonaceous materials can be employed. The fermentation reaction product, i.e., bacterial cells are then employed according to this invention by contacting them with the anionic surfactant to produce the improved viscosifier according to this invention. The whole bacterial cells can be recovered from the fermentation media if desired such as by centrifugation and treated in accordance with this invention. It is economically preferable, however, to eliminate bacterial cell separation procedure and to merely treat the whole fermentation product containing the bacterial cells.

The bacterial culture containing the bacterial cells can be diluted, if desired, by the addition of water or aqueous solutions such as brine. They can also be concentrated by the removal of water but it is important that the bacterial culture contain at least 0.2 weight percent of bacterial cells. Bacterial cultures comprising from about 2 to 4 weight percent of bacterial cells are routinely produced. The anionic surfactant is then employed in an amount to provide from about 0.001 to 0.02, preferably 0.004 to 0.015 parts by weight of said surfactant per 100 parts by weight of said bacterial culture. The treated bacterial culture is then employed as the viscosifier for improving an aqueous medium drive fluid which is used to displace the oil from oil-bearing reservoirs. The treated bacterial culture representing the viscosifier of this invention is employed in an amount to provide from about 5 to 100, preferably 30 to 70 parts by weight of said viscosifier per 100 parts by weight of said aqueous driving fluid.

The final viscosity of the aqueous medium driving fluid can thus be regulated by the amount of viscosifier incorporated therein. It is, of course, preferred to have a mobility ratio of the oil to the aqueous medium driving fluid within the reservoir be equal to 1 so that the oil and the driving fluid will generally move through the reservoir with equal ease. One skilled in the art can determine the relative viscosity of aqueous driving fluid needed to improve the oil displacement effectiveness of the aqueous driving fluid process. The viscosity of the aqueous medium driving fluid thus would generally be at least 6 centipoises at a Brookfield viscosity meter shear rate of 60 r.p.m. at 120° F. using a UL adapter. Aqueous medium driving fluid having a lower viscosity than 6 centipoises can, of course, be employed such as where the oil has a low viscosity rating. The upper viscosity of the drive fluid limits are determined primarily by economic considerations and, of course, oil viscosity.

The viscosifiers prepared according to this invention are stable and are not appreciably affected by ionic materials found in most oil-bearing reservoirs and thus they are particularly more attractive than water-thickening agents employed in the past. Various preservatives such as formaldehyde can be added to our viscosifier but they are not essential. Thus, the viscosifiers of this invention can be incorporated into aqueous brine solutions or water, and the like, and then employed as the driving fluid. The viscosifiers of this invention also have demonstrated the capability to function as injected profile correctors, e.g., partially plugging the more permeable zones of the formation such that the flow of injected fluid into all zones would generally be the same and thus prevent channeling. This, at least in part, may account for the exceptional effectiveness of our viscosifiers.

The surface agents employed according to this invention are anionic surfactants. Compounds of this class are generally characterized as forming ions in solution and are typical colloidal electrolytes and are characterized in that upon ionization the ion containing the large hydrophobic group assumes a negative charge and becomes the anion. Their general properties and behavior are generally attributed to the dual character of the molecules of these substances in that they are made up of two parts, a relatively large elongated part, the hydrophobic group and a small solubilizing, polar group, the hydrophilic group. Anionic surfactants are widely known and commercially available. Mixtures of anionic surfactants can also be employed according to this invention. Alkylarenesulfonates, sulfated alcohols, and the like, are exemplary classes of anionic surfactants. Exemplary anionic surfactants that can be employed are propylated naphthalenesulfonic acid (sodium salt); di(2-ethylhexyl)ester of sodium sulfosuccinic acid; sodium alkylnaphthalenesulfonate; sulfonated monoglyceride of coconut fatty acid (sodium salt); polymerized alkylated arenesulfonic acid (sodium salt); sodium oleyl sulfate; sodium lauryl sulfate; sodium oleylisethionate; sodium dibutylnaphthalenesulfonate; sodium dodecyl benzenesulfonate; or sulfonated alkylbenzimideazole (sodium salt), and the like.

Illustrative of the foregoing discussion and not to be interpreted as limitation of the scope thereof, or on the materials herein employed, the following examples are presented.

EXAMPLE I

Tests were conducted to demonstrate the suitability of the viscosifiers of this invention for employment in the recovery of oil from a model reservoir. The model reservoir consisted of 6-foot tubes packed with reservoir sand which was oil-saturated prior to testing. The tubes were flooded with brine solution until breakthrough. An aqueous medium employing the viscosifier of this invention was then employed as the drive fluid. The oil saturation, $S_o$, of the samples tested is reported as a percentage of the pore volumes. The aqueous medium drive fluids were prepared by mixing the viscosifiers of the invention with simulated Burbank brine (SBB) in the indicated ratios. The viscosifiers were prepared by treating the indicated bacterial culture product recovered with an anionic surfactant. The bacterial culture preparation employing *Pseudomonas* sp., viscosifier preparation, and the preparation of the aqueous medium drive fluids are reported in table I.

TABLE I

| | Bacterial cult. prep. | | | Aqueous medium fluid prep., prep., ratio by weight of visc./brine [2] | Viscosity of aqueous med. dr. fluid [3] | |
|---|---|---|---|---|---|---|
| Run No. | Carbon source— substrate | Bacterial cells, grams/liter recovered prod. | Visc. prep. sodium lauryl sulfate php [1] | | Yield pt. | Plastic visc. |
| 1 | Methaonl | 26.37 | .006 | 1/1 | 1.2 | 3.8 |
| 2 | do | 26.37 | .006 | 1/0.5 | 1.86 | 4.9 |
| 3 | n-Paraffin | 9.85 | .004 | 1/4 | .25 | 1.44 |
| 4 | Methanol | 14.2 | .01 | 1/1 | 14.0 | 6.3 |

[1] Parts by weight per 100 parts by weight of bacterial culture.
[2] Simultaed Burbank brine, 18 liters deionized water, 725.3 grams NaCl, 190.7 grams CaCl₂, 80.4 grams MgCl₂.6H₂O.
[3] Using Brookfield viscometer, UL adapter, at 120° F., 60 r.p.m., yield point is expressed in Brookfield scale units, the plastic viscosity in centipoises.

The results of the aforedescribed tests demonstrating the suitability of the viscosifiers of this invention are reported in Table II.

TABLE II
Oil Recovery

| Run No.[1] | Sand [2] | Oil [3] | $S_o$,[4] after brine, percent | $S_o$, after aqueous medium, percent | $\Delta S_o$, percent [5] |
|---|---|---|---|---|---|
| 1 | Nacatoch | Smackover | 54.0 | 14.0 | 40.0 |
| 2 | do | do | 56.9 | 17.5 | 39.4 |
| 3 | Burbank | Burbank | 45.8 | 33.9 | 11.9 |
| 4 | Nacatoch | Smackover | 56.27 | 13.95 | 42.32 |

[1] Run numbers correspond to some run numbers for aqueous drive fluid preparation.
[2] Core samples from indicated fields.
[3] Sand saturated with oil from indicated field, Burbank oil viscosity about 3 centipoises at 120° F., UL adapter, Smackover about 44 centipoises at 120° F., UL adapter (Brookfield, viscometer).
[4] Oil saturation remaining in sample, percent of pore volume.
[5] Incremental oil recovered, according to invention.

The above data clearly demonstrates the ability of viscosifiers prepared in accordance with this invention for dramatically causing additional oil to be displaced from the tested samples.

EXAMPLE II

Permeability profile adjustment tests were made to demonstrate the permeability reducing properties of the viscosifiers of this invention on sand from the Ottawa and Nacatoch fields. Two 6-foot tubes were filled with sand, one with Ottawa sand to represent a zone of high permeability and the other with Nacatoch outcrop sand to represent a zone of low permeability. The tubes were separately flooded with simulated Burbank brine at room temperature to determine their respective permeabilities. The permeability of the Ottawa sand to simulated Burbank brine was 10,500 millidarceys (md.), and 744 (md.) for the Nacatoch sand.

A bacterial culture prepared from a methanol substrate and *Pseudomonas* sp. contained 22.5 grams/liter of whole cells and was treated with 0.008 parts by weight of sodium lauryl sulfate per 100 parts by weight of bacterial culture. This product was diluted with 1 part by weight simulated Burbank brine per 1.3 parts by weight bacterial culture to form the aqueous medium driving fluid of this invention. Formalin solution (37 percent) was added in an amount to provide 1 milliliter of said formalin solution per kilogram of culture of bacterial cells.

The aqueous driving fluid of this invention was injected into each of the tubes until breakthrough. The injection data are reported in Table III.

TABLE III

| Tube | Ottawa | Nacatoch |
|---|---|---|
| Pore Volume, ml. | 200 | 208 |
| Viscosifier Injected, ml. | 240 | 300 |
| PV Injected | 1.20 | 1.44 |
| Final Pressure, p.s.i. | 183 | 400 |
| Flow, ml./min. | 3 | 3 |

The tubes were closed and shut in at 120° F. for 6 days to determine the permeability reducing properties of the viscosifiers of this invention after 6 day's aging. After that time, simulated Burbank brine was injected into the tubes. Effluent was collected over 12-minute intervals and their viscosities run on a Brookfield viscometer at room temperature at 60 r.p.m. using a UL adapter. The brine injections were continued until the viscosity of the effluent remained constant thus representing permeability stabilization of the sand employed.

The permeability of the Nacatoch sand to SBB was reduced from the original value of 744 (md.) to 13 (md.), and the permeability of Ottawa sand reduced from the original value of 10,500 (md.) to 652 (md.) after the simulated Burbank brine flush, reported above, thus demonstrating the effectiveness of our viscosifiers to function as permeability profile adjusters.

EXAMPLE III

Three series of tests were conducted to demonstrate the relative effectiveness, as viscosifiers, of the compounds tested on aqueous mediums.

The Series A test sample was prepared using 10 milliliters of a bacterial culture grown on a methanol substrate employing *Pseudomonas* sp. The 10 milliliter bacterial culture contained 21.53 gram/liter of bacterial cells. This culture was diluted 2:1 with water (20 milliliters of water), and the viscosity of the aqueous media measured on a Brookfield viscometer, at room temperature, using a UL adapter at the r.p.m., as indicated in the following Table.

Series B samples were identically prepared and tested except that the bacterial culture was treated with 0.4 grams per 100 milliliters of bacterial culture with a nonionic surfactant, Igepal CO-530, General Aniline and Film, [nonylphenoxypoly(ethyleneoxy)ethanol].

Series C samples were prepared as in Series B except that an equal amount of an anionic surfactant, sodium lauryl sulfate, was added to the bacterial culture in place of the nonionic surfactant. Viscosity data for the foregoing series are reported in table IV.

TABLE IV

| Run No. | R.p.m. | Viscometer reading | | | Viscosity, centipoises | | |
|---|---|---|---|---|---|---|---|
| | | Series A | Series B | Series C | Series A | Series B | Series C |
| 1 | 60 | 17.5 | 21.5 | 70.0 | 1.7 | 2.11 | 6.96 |
| 2 | 30 | 10.0 | 10.5 | 45.0 | 2.0 | 2.08 | 8.98 |
| 3 | 12 | 5.6 | 5.0 | 25.2 | 2.8 | 2.50 | 12.60 |
| 4 | 6 | 4.5 | 3.3 | 16.4 | 4.5 | 3.3 | 16.40 |
| 5 | 3 | 4.0 | 2.0 | 12.0 | 8.0 | 4.0 | 24.00 |
| 6 | 1.5 | 3.2 | 1.5 | 8.5 | 13.0 | 6.0 | 34.00 |
| 7 | 0.6 | 1.5 | 0.75 | 5.7 | 15.0 | 7.5 | 57.00 |
| 8 | 0.3 | 1.0 | 0.5 | 5.5 | 20.0 | 10.0 | 101.00 |

As will be evident to those skilled in the art, various modifications of this invention can be made or followed in light of the discussion and disclosure herein set forth without departing from the scope or the spirit thereof.

We claim:

1. In a process for recovering oil from an oil-bearing formation by injecting an aqueous medium drive fluid into said formation to displace oil therefrom the improvement which comprises employing an aqueous medium drive fluid that contains a viscosifier produced by the action of an anionic surfactant upon a bacterial cellular culture.

2. The process according to claim 1 wherein said viscosifier is employed in an amount to provide from about 5 to 100 parts by weight of said viscosifier per 100 parts by weight of said aqueous medium.

3. The process of claim 2 wherein said anionic surfactant is employed in an amount to provide from about 0.001 to 0.02 parts by weight of said surfactant per 100 parts by weight of said bacterial culture and wherein said bacterial culture contains at least 0.2 weight percent of bacterial cells.

4. The process according to claim 3 wherein said surfactant is employed in an amount to provide from about 0.004 to 0.015 parts by weight of said surfactant per 100 parts by weight of said bacterial culture and wherein said bacterial culture comprises gram-negative bacteria.

5. The process according to claim 3 wherein said bacterial culture comprises from about 2 to 4 weight percent of bacterial cells and said viscosifier is employed in an amount to provide from about 30 to 70 parts by weight of said viscosifier per 100 parts by weight of said aqueous medium drive fluid.

6. The process according to claim 5 wherein said bacterial culture comprises *Pseudomonas* sp. and wherein said anionic surfactant comprises sodium lauryl sulfate.